United States Patent [19]

Wilson

[11] Patent Number: 4,540,421
[45] Date of Patent: Sep. 10, 1985

[54] MATERIAL DISCHARGE UNIT

[75] Inventor: David J. Wilson, Orpinton, England

[73] Assignee: Matthews and Yates Limited, Manchester, England

[21] Appl. No.: 573,954

[22] Filed: Jan. 26, 1984

[30] Foreign Application Priority Data

Jan. 28, 1983 [GB] United Kingdom ............... 8302350
Feb. 4, 1983 [GB] United Kingdom ............... 8303117

[51] Int. Cl.³ ................... B01D 50/00; B01D 46/24; B65G 53/06
[52] U.S. Cl. ................... 55/432; 55/322; 55/327; 55/276; 55/461; 209/250; 209/398; 406/160; 406/169; 406/171
[58] Field of Search ................ 55/276, 327, 337, 432, 55/461, 465, DIG. 14, 321, 322, 323; 209/250, 398; 406/169, 171, 173, 159, 160, 183

[56] References Cited

U.S. PATENT DOCUMENTS

| 603,285 | 5/1898 | Porbeck | 209/250 |
| 705,374 | 7/1902 | Benefield | 406/171 |
| 1,031,151 | 7/1912 | Smith | 55/276 |
| 1,339,240 | 5/1920 | Travis | 55/432 |
| 2,315,651 | 4/1943 | Peterson | 209/398 |
| 2,890,081 | 6/1959 | Terrett | 406/169 |
| 3,524,681 | 8/1970 | Boon | 55/432 |
| 3,553,944 | 1/1971 | Hum et al. | 55/461 |
| 4,251,356 | 2/1981 | Harte | 209/250 |
| 4,300,926 | 11/1981 | Brooks | 209/250 |

FOREIGN PATENT DOCUMENTS 1408003 10/1975 United Kingdom .

Primary Examiner—David L. Lacey
Attorney, Agent, or Firm—Toren, McGeady, Stanger, Goldberg & Kiel

[57] ABSTRACT

It is an object of the invention to provide a unit for discharging material, such as lengths of paper strip from an air stream. As shown in FIG. 1, a flow of air with suspended waste material enters, as illustrated by the arrow 1, along a duct 2. The flow is into an entry section 4 of a perforated duct 5 located within an outer casing 6 which forms an air duct. At the downstream end, the duct 5 leads into a bend section 7 which is perforated on the outside of the bend and at the sides. The flow of air or gas continues out of the open end 8 of the casing 6 as indicated by the arrow 9, while the suspended solid material is deflected by the bend section into a discharge duct 11, down which the solid material falls by gravity. The duct 11 is shown as including two pairs of optional isolating flap valves 12 so as to provide an air lock arrangement so that the air flow in the duct 11 is substantially zero.

9 Claims, 11 Drawing Figures

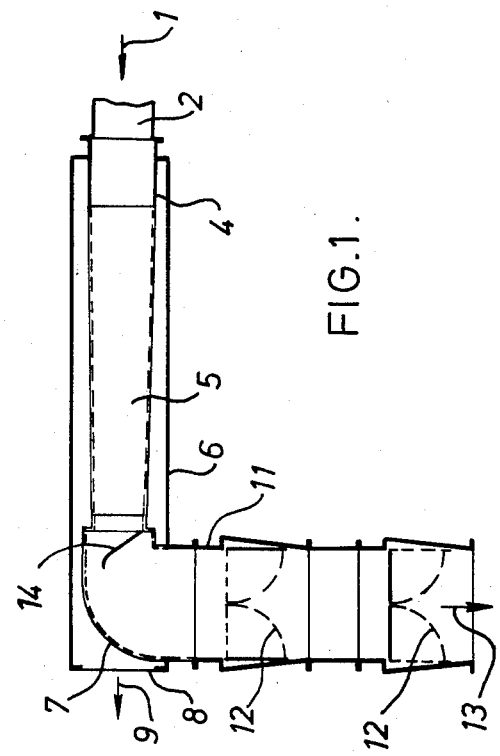
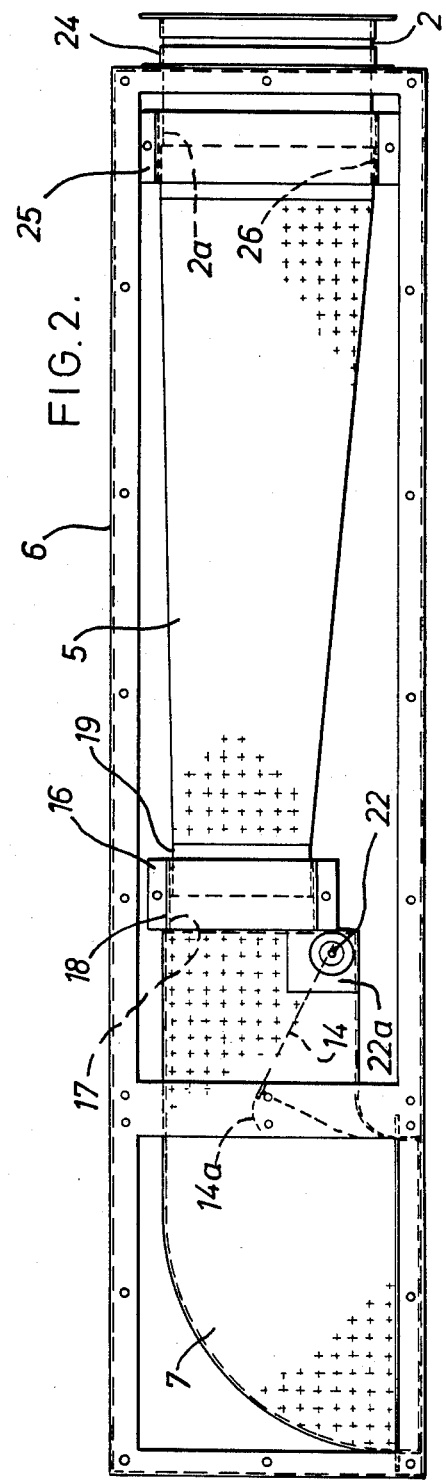

MATERIAL DISCHARGE UNIT

This invention relates to material discharge units.

In waste recovery systems, e.g. in the paper, board, plastics and foil industries, waste material is trimmed off and collected by suction, clipped into short lengths if necessary, and conveyed in air streams to a discharge point, where it is separated from the conveying air stream and discharged.

It is conventional to use a cyclone separator for such separation and discharge. However, for large volume flows, cyclones tend to be bulky and may need to be housed outside of a factory building, e.g. on the roof. Such cyclones then need substantial support structures, e.g. steel frameworks extending down to the factory floor level. The cost of the cyclone thus becomes greatly increased. Also, the appearance of cyclone separators is regarded as environmentally detrimental and it may not always be possible to obtain planning consent for the erection of one or more cyclone separators on the roof of a building or in any other visually obtrusive location.

In GB-A No. 1247211 there is shown a form of apparatus for separating laundry from a conveying air stream. The apparatus disclosed in that specification consists of an arcuate conduit or bend enclosed within a housing. These comparatively heavy and bulky items of laundry remain in the conduit and collect on counterweighted doors for discharge. The air passes through the conduit into the housing and is discharged separately. With such an arrangement, the comparatively heavy items of laundry do not tend to be held onto the interior of the duct by the flowing air.

It is an object of the invention to provide a form of material discharge unit which is more compact than a cyclone separator and which preferably can be nested so that multiple feeds may be discharged with a minimum space requirement.

In accordance with a first aspect of the invention, there is provided a material discharge unit for separating lightweight solid material elements of substantial size from a conveying air or gas stream, comprising a housing, an elongate perforate duct in the housing, an inlet for feeding the conveying streams, with suspended solids, to the interior of the perforate duct, a perforate bend within the housing at the discharge end of the perforate duct to discharge the solid material at an angle to the air flow direction, generally vertically downwardly, while allowing the gas stream to continue onwardly to a discharge end of the housing, and a deflection baffle located at the junction between the elongate duct and the perforate bend to deflect the conveying stream and solid material away from the solid material discharge direction so that they impinge on the wall of the perforate bend at an acute angle.

The perforate duct allows some of the conveying air or gas to form an air stream outside the duct and bend, and the separation of the material from the rest of the air or gas takes place at the bend.

The baffle provides some back pressure to enhance air discharge via the perforations in the duct, but its primary function is to cause the solids to impinge at a comparatively shallow angle on the perforate bend, so that blockage of the perforations by material impelled by the air stream is avoided.

For use with an air stream carrying large pieces of paper or cardboard, e.g. from a shredder, the baffle may be pivotably mounted and provided with counterbalance weights or springs holding it in its normal position, so that the baffle can be deflected by the large pieces of material, thus preventing jams of material from building up against the baffle.

An air lock may be provided in a solid material discharge duct to isolate the discharged solid material from the gas stream.

The housing is preferably of rectangular cross section so as to nest with corresponding housings of similar units.

It has also been found that material discharge units in accordance with the invention may be used as a very effective device for separating solid materials which are in pieces or particles of different sizes. The solid materials to be separated, for example, wood shavings and sawdust mixed together, are conveyed by a stream of air or gas into the unit, in which the perforations at the bend are of such a size as to permit passage of the air or gas together with the finer fraction of the materials to be separated while preventing passage of the coarser fraction of the materials to be separated. The coarser fraction is then discharged from the unit, while the air or gas stream carrying the finer fraction is passed through a filter or other recovery unit to separate the fine solids from the air or gas. An suitable recovery unit can be used, for example a fabric filter provided with a shaker or back-blowing jets. A fan may be provided to ensure adequate flow through the filter.

In accordance with a second aspect of the invention, there is accordingly provided a method of separating coarse and fine fractions of solid material from a mixture, comprising passing the mixture in suspension in a gas stream to the inlet of a unit in accordance with the invention as set forth above, the perforations in the duct and bend being such as to permit passage of the fine fraction but to impede passage of the coarse fraction, collecting the coarse fraction at the outlet from the perforate bend, and separating the fine fraction from the gas stream after discharge from the unit.

The invention will be further described with reference to the accompanying drawings, in which:

FIG. 1 is a diagrammatic side view illustrating a material discharge unit embodying the present invention;

FIG. 2 is a side view to a larger scale illustrating some details of FIG. 1;

Figure 3:
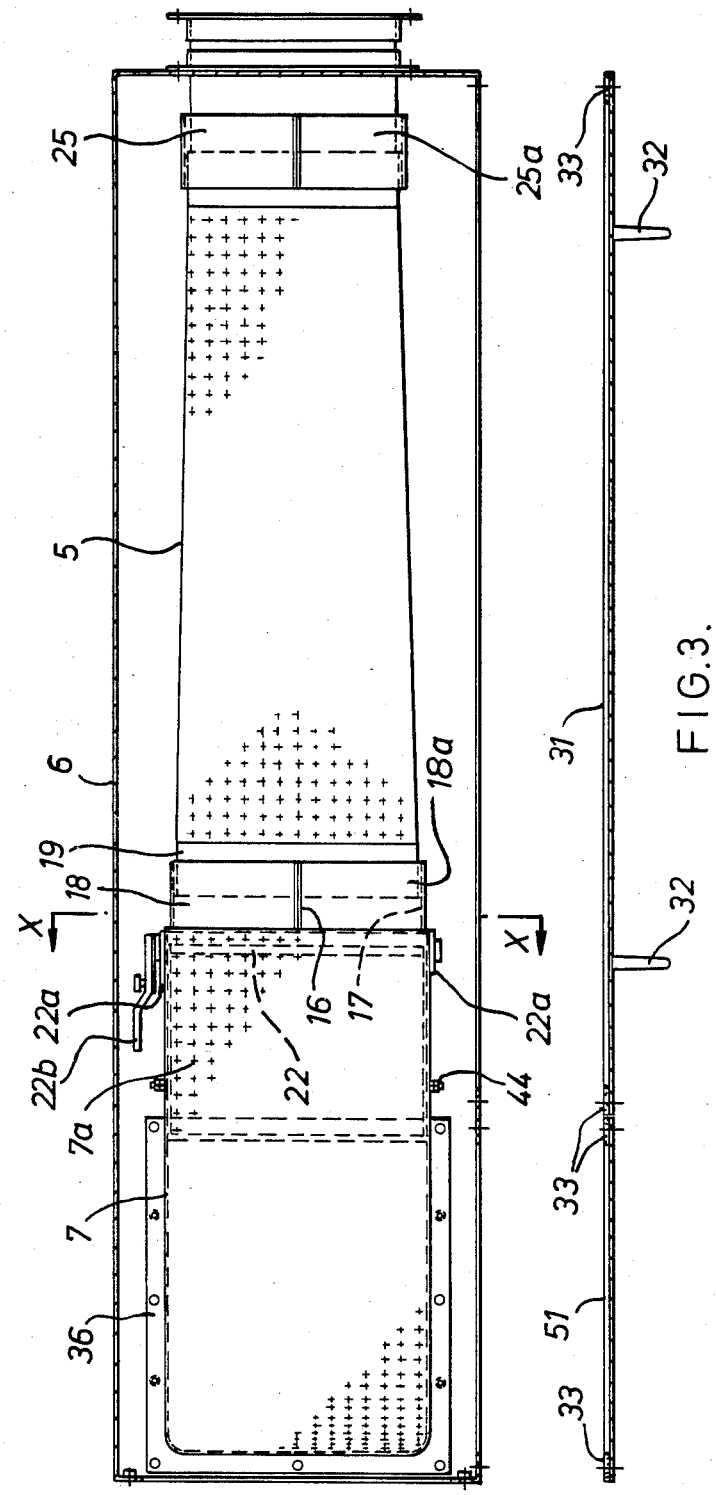
FIG. 3 is a plan view of the discharge unit with a closing panel separated for clarity of illustration.

Turning first to FIG. 1, the flow of air with suspended waste material enters, as illustrated by the arrow 1, along a duct 2.

The flow is into an entry section 4 of a perforated duct 5, changing from a circular section of the duct 2 to a rectangular section, and located within an outer casing 6 forming an air duct. At the downstream end, the duct 5 leads into a bend section 7 which is perforated on the outside of the bend and at the sides. The flow of air or gas continues out of the open end 8 of the casing 6 as indicated by the arrow 9, generally into ducting, while the suspended solid material is deflected by the bend section into a discharge duct 11, down which the solid material falls by gravity. The duct 11 is shown as including two pairs of isolating flap valves 12 so as to provide an air lock arrangement so that the air flow in the duct 11 is substantially zero. An arrow 13 indicates the discharge of the solid material, e.g. into a baler if the material is to carted away as scrap, or into a pulping tank or the like if it is to be immediately re-cycled. While the air lock system has been illustrated, it will be understood that its use is not mandatory. In particular, if a baler or the like is used, there is sufficient resistance to air flow to render them unnecessary in most cases. Where the discharge is into an open hopper, it has been found that only a comparatively small proportion of the air flow is diverted by the bend, so that the air lock may not be required.

Within the bend 7, and adjacent to the exit from the duct 5 there is provided an adjustable baffle plate 14.

In operation, the air with suspended waste material enters via the duct 2 so that the solid material is carried forward through the duct 5. Some of the air permeates through the perforated duct 5 into the duct formed by the casing 6. In addition, the baffle plate 14 creates some back pressure to further enhance this action. The principle function of the baffle plate 14 is to deflect the flow of air and suspended material so that it impinges on the outer curved wall of the bend 7 at an acute angle, and this reduces the tendency of the solid material to adhere to the bend, and possibly build up to such an extent that the perforate wall of the bend would become partially or wholly blocked. The material strikes the wall with a substantial component of velocity along the wall, and consequently is easily carried around the bend and into the vertical duct 11. The remaining air passes out through the perforate walls of the bend 7 and is discharged by further ducting.

It is to be noted that if the air itself carries sensible heat, then the use of further ducting to carry the air away, rather than discharging it freely from a cyclone, enables a useful energy saving to be achieved, since the heat may be extracted from the air, e.g. for space heating. If the air is to be returned into a building it should be filtered e.g. in a fabric filter provided with a shaker or back-blowing air jets for cleaning. A fan will normally be required to overcome the flow resistance due to the filter.

The material entering the duct 11 is normally discharged freely, but if it is desired to isolate the outlet from the duct virtually completely from the air flow, then the flap valves 12 shown in FIG. 1 may be utilized to form an air lock. In such a case, the lower pair of flap valves would normally be closed with the upper pair open until the level of material resting on the lower flap valves 12 has reached a predetermined height. At this point the upper flap valves would close and the lower pair would be opened to discharge solid material. They would then be closed again and the upper pair re-opened to allow the comparatively small amount of material accumulated on them to fall onto the lower pair as the start of the next batch for discharge. This operation would normally be performed on an automatic timing cycle, but could be controlled by sensing the amount of material accumulating.

The control equipment would also normally include a blockage sensing arrangement whereby if the outlet of material from the duct 11 were totally blocked, a relief line would open to discharge material to an accumulation area pending switch off of the machine from which the waste material is being collected, or clearance of the blockage.

Figure 7:
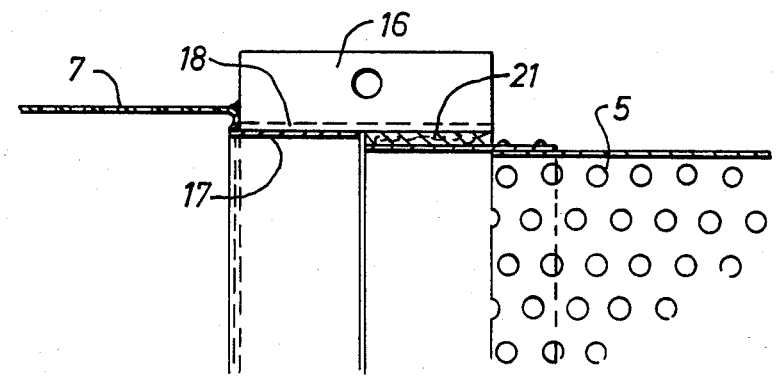
FIGS. 7 and 8 are sectional views of further details of the discharge unit.

FIGS. 2 and 7 show more detail of the duct 5, casing 6 and bend 7.

The bend itself is provided with a rectangular spigot 17 which has attached thereto one part 18 of a generally rectangular clip band extending beyond the spigot 17 and adapted to receive a rectangular fitting 19 on the elongate duct 5. This structure is shown in more detail in FIG. 7. A second, loose, clip band part 18a is then bolted to the illustrated band part 18 by means of flanges 16 to secure the end of the duct 5 to the spigot 17. A band of felt to ensure tightness of fit is illustrated at 21 in FIG. 7.

Figure 4:
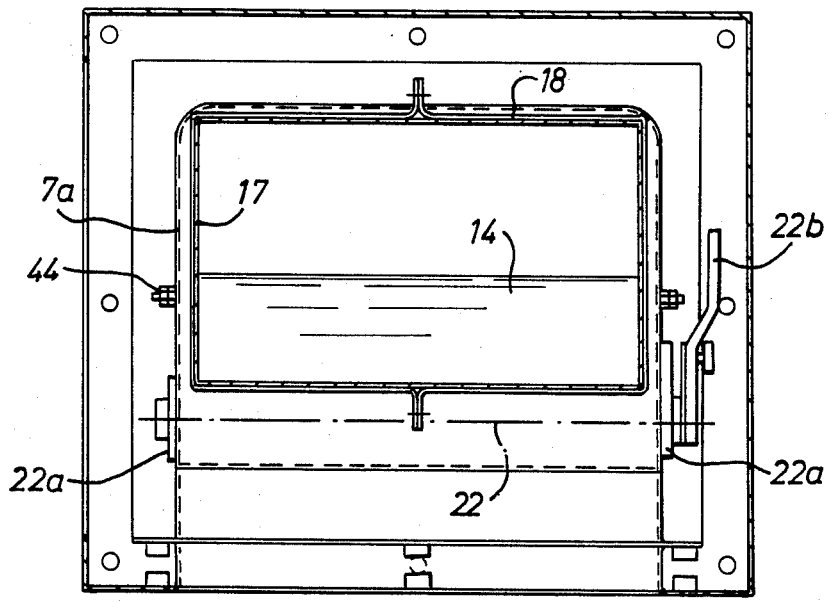
FIG. 4 is a section on the line X—X of FIG. 3.

FIGS. 3 and 4 show that the width and height of a throat or entry section 7a of the bend 7 are rather greater than the width and height of the spigot 17.

The baffle 14 is mounted for pivotal adjustment within the entry section 7a of the bend 7 by means of a square shaft 22 solid with the baffle 14 and mounted in plates 22a welded to the sides of the bend 7 adjacent to the spigot 17. Adjustment is by means of a handle 22b solid with the shaft 22 and clampable. In order to enable the baffle 14 to be at a fairly shallow angle, and to minimize turbulence, the entry section 7a is of substantial length.

Figure 5:
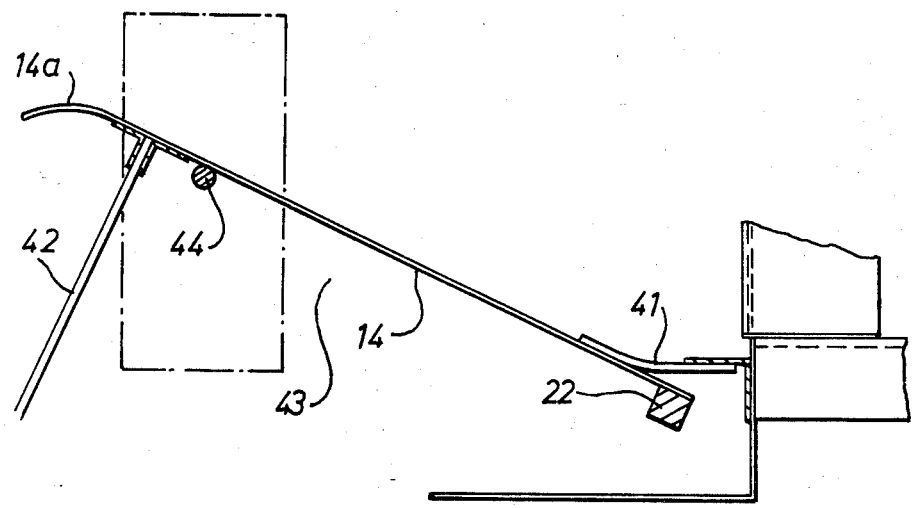
FIG. 5 is a side elevation showing some details of FIG. 4.

FIG. 5 shows the square section of the shaft 22 and also shows the provision of rubber seals or boots 41 and 42 to prevent solid material entering and building up in the space 43 behind the baffle 14. The baffle 14 is provided with a back stop or support rod 44 extending across the entry zone 7a of the bend 7. This is designed to ensure that the baffle is always maintained at a working angle even if the pressure of incident air moves it against the clamping force.

The upper end 14a of the baffle plate 14 is curved as shown in reduce turbulence.

Figure 8:
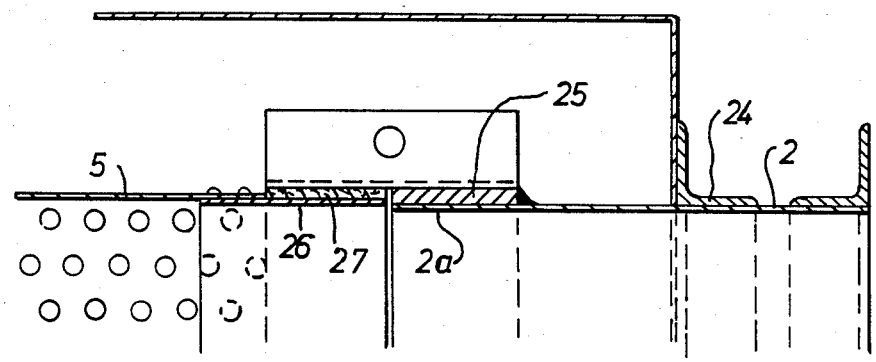

FIG. 8 shows that the inlet duct 2 is provided with a mounting ring 24 for attachment to the casing 6. An extension 2a of the inlet duct 2 has welded to it a fixed clip band part 25, similar to the clip band part 18, and the clip band formed by the fixed part 25 and the corresponding loose part 25a of FIG. 3 receives an extension 26 of the inlet end of the perforate duct 5, again with interposition of a ring of felt 27.

Wing nuts may cooperate with set screws welded to the fixed clip band parts 18 and 25 so as to hold the corresponding loose parts 18a and 25a.

The clip band parts 18 and 25 are provided for easy removal and replacement of the perforate duct 5. It will be seen from FIG. 3 that the casing 6 has a readily removable side panel 31, fitted with handles 32, for access to the duct 5 and the interior of the casing. A further readily releasable panel 51 allows access to the bend 7. Sealing strips are shown at 33. The panels 31 and 51 may be diamond creased for strength.

Figure 6:
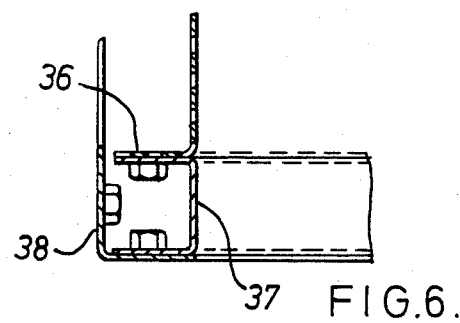
FIG. 6 is a sectional view of a detail of the discharge unit.

FIGS. 2, 3 and 4 also shown more detail of the shape of perforate bend 7, and an out-turned flange 36 on its lower side. This flange 36 is also shown in FIG. 6 as being secured to a folded sheet metal channel member 37 itself fixed to a frame member 38 forming part of the casing 6 and adapted to receive a mounting flange of the duct 8.

The perforate bend 7 and its entry section 7a are of generally rectangular cross section, with rounded corners, as best seen in FIGS. 3 and 4. This rounding minimizes the build up of material in the corners of the section while enabling a generally rectangular shape to be maintained for nesting of adjacent units.

It is envisaged that the overall length of the casing 6 will be, for example, in the region of 2 m and square with a side of approximately 50 cm. Alternatively, as illustrated, it may be rectangular, e.g. with sides of 45 and 53 cm. Obviously, these dimensions will vary with the application. It will be seen that the size is quite limited and considerably smaller than the conventional cyclone separator to handle similar air flows. In particular, the separator can be mounted within a length of conventional air ducting, so that it will not require any more floor space than is necessary to collect the material, e.g. that occupied by a baler.

Figure 9:
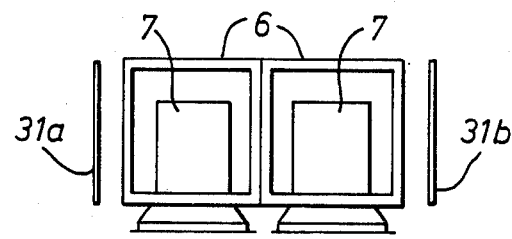
FIGS. 9 and 10 show forms of nesting of discharge units.
Figure 10:
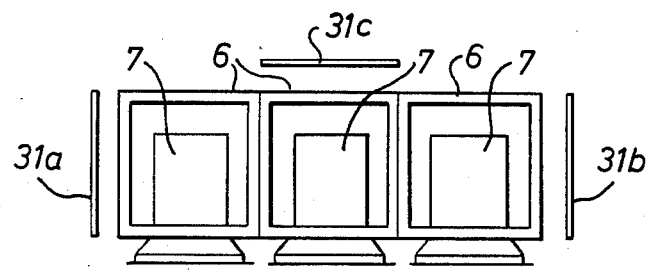

FIGS. 9 and 10 show respectively groups of two and three nesting material separating units, as viewed from the air discharge end. The arrangement of FIG. 9 shows two casings 6 nested side by side, and it will be seen that the removable panels 31a and 31b are oppositely handed so that access may be obtained to the interior of either unit. The bends 7 are shown as discharging separately.

The arrangement of FIG. 10 includes a third unit sandwiched between the two units of FIG. 9. The third unit has its access panel 31c located in its upper wall. The access panels 31a and 31b are similar to those of FIG. 9.

Figure 11:
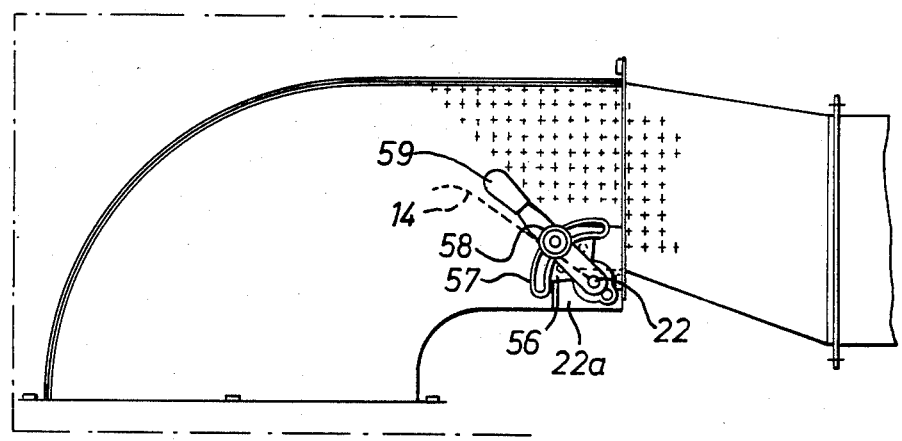
FIG. 11 is a view similar to part of FIG. 2 and showing a modification.

FIG. 11 shows some details of an alternative form of setting device for the baffle 14 by rotating the shaft 22. One plate 22a has mounted thereon a plate 56 carrying a quadrant slot 57 cooperating with a clamping screw 58 mounted on an adjusting handle 59. Once the required angle of the baffle 14 has been set, the support or back stop 44 for the baffle is introduced through a suitably located aligned pair of holes in the perforate bend 7.

In some cases it may be found appropriate to introduce an acceleration cone at the inlet end of the duct 5 to accelerate the air stream on entry to the duct 5 and throw the material forward towards the entry section 7a or throat of the bend 7.

When the unit is to be used to separate fractions of solid material, and possibly in other cases, there may be a requirement for adjustment of the effective size of the apertures in the perforate bend and elsewhere. This may be achieved by using a pair of similar configuration elements telescoped one inside the other, so that the apertures may be in alignment for maximum size and moved out of alignment for mutual partial obturation.

In certain cases it may be necessary to minimize the noise factor and for this purpose the unit may be housed in acoustic casing. This may be achieved by forming the casing 4 and removable panels in a double skin construction with an infill of suitable sound-deadening material.

Various other modifications may be made within the scope of the invention.

I claim:

1. In a material discharge unit for separating lightweight solid material elements of substantial size from a conveying gas stream: the improvement that the unit comprises an axially elongated housing having an inlet end and a discharge end having gas outlet means, an axially elongated perforate duct located in and extending through the housing, said perforate duct having an inlet located at one end thereof for feeding the conveying stream, with suspended solids, to the interior of the perforate duct and a discharge end spaced from the inlet end, a perforate bend located within the housing and having an inlet end and a discharge end with the inlet end end connected to the discharge end of the perforate duct, the bend being constructed and arranged so as to discharge the solid material at an angle to the gas flow stream direction through said perforate duct, generally vertically downwardly, while allowing the gas stream to continue onwardly to the discharge end of the housing and out the gas outlet means, and a deflection baffle located near the junction between the discharge end of the perforate duct and the inlet to the perforate bend, the deflection baffle being arranged so as to deflect the conveying stream and solid material away from the solid material discharge direction in the perforate duct so that the conveying stream and solid material impinge on the wall of the perforate bend at an acute angle to the axis of the perforate duct.

2. A material discharge unit as claimed in claim 1, in which the perforate bend transverse to the axis thereof is of generally rectangular cross section with rounded angles.

3. A material discharge unit as claimed in claim 1, wherein the inlet end of the perforate bend has an inlet throat and the deflection baffle is located in the said inlet throat.

4. A material discharge unit as claimed in claim 1, comprising a solid material discharge duct connected to and extending downwardly from the discharge end of the perforate bend, and an air lock is provided in the solid material discharge duct to isolate the discharged material from the gas stream.

5. A material discharge unit as claimed in claim 1, in which the housing transverse of the axial direction thereof is of rectangular cross section so as to nest with corresponding housings of adjacent similar units.

6. A material discharge unit as claimed in claim 1, wherein the inlet end of the perforate bend has an inlet throat of substantial length and the baffle is locted in the said throat.

7. A material discharge unit as claimed in claim 1, wherein the cross sectional area of said perforate duct extending transversely of the axial direction thereof decreases from the inlet end to the discharge end thereof and further including means at the discharge end of said perforate duct for securing said perforate duct to said perforate bend.

8. A material discharge unit as claimed in claim 1, wherein the axis of said perforate duct extends generally horizontally, said perforate bend extends through an angle of approximately 90° from the discharge end of said perforate duct to the discharge end of said bend, said perforate bend has a small radius side and a large radius side, and said deflection baffle is positioned at the inlet end of said perforate bend for directing the conveying stream and solid material toward the large radius side of said perforate bend.

9. A material discharge unit as claimed in claim 1, further including means connected to said deflection baffle for selectively positioning said baffle in the path of the conveying stream and solid material, and a stop for holding said deflection baffle in the adjusted position.

* * * * *